(12) United States Patent
Kim et al.

(10) Patent No.: US 10,033,028 B2
(45) Date of Patent: Jul. 24, 2018

(54) PRISMATIC BATTERY HAVING ELECTROLYTE INJECTION-HOLE CAPABLE OF PROVIDING EXCELLENT SEALING ABILITY

(71) Applicant: LG CHEM, LTD., Seoul (KR)

(72) Inventors: Hong Kue Kim, Cheongju-si (KR); Seungtae Lee, Cheongwon-gun (KR); Eun Jung Lee, Cheongwon-gun (KR); Hakkyun Kim, Cheongju-si (KR)

(73) Assignee: LG CHEM, LTD., Seoul (KR)

( * ) Notice: Subject to any disclaimer, the term of this patent is extended or adjusted under 35 U.S.C. 154(b) by 221 days.

(21) Appl. No.: 13/834,670

(22) Filed: Mar. 15, 2013

(65) Prior Publication Data

US 2013/0202927 A1   Aug. 8, 2013

Related U.S. Application Data

(63) Continuation of application No. PCT/KR2011/007431, filed on Oct. 7, 2011.

(30) Foreign Application Priority Data

Oct. 8, 2010   (KR) .................. 10-2010-0098032

(51) Int. Cl.
*H01M 2/36* (2006.01)
*H01M 2/02* (2006.01)

(52) U.S. Cl.
CPC ......... *H01M 2/361* (2013.01); *H01M 2/0217* (2013.01); *H01M 2/365* (2013.01)

(58) Field of Classification Search
None
See application file for complete search history.

(56) References Cited

U.S. PATENT DOCUMENTS

| 2004/0161666 A1* | 8/2004 | Haas ................. H01M 2/0404 429/185 |
| 2005/0164079 A1* | 7/2005 | Kim ..................... H01M 2/365 429/174 |
| 2007/0264565 A1 | 11/2007 | Yeo et al. |

FOREIGN PATENT DOCUMENTS

| JP | 11-135082 A | 5/1999 |
| JP | 11-154506 A | 6/1999 |

(Continued)

OTHER PUBLICATIONS

International Search Report for PCT/KR2011/007431 dated Apr. 27, 2012.

*Primary Examiner* — Barbara L Gilliam
*Assistant Examiner* — Adam A Arciero
(74) *Attorney, Agent, or Firm* — Birch, Stewart, Kolasch & Birch, LLP

(57) ABSTRACT

Disclosed herein is a secondary battery having an electrode assembly mounted in a prismatic container, wherein the inside of an electrolyte injection hole formed in a base plate mounted to an open upper end of the prismatic container includes an upper part having a chamfered structure in which the diameter of the electrolyte injection hole is gradually decreased downward and a lower part having a non-chamfered structure continuously formed from the chamfered structure, and, when a sealing member is pressed into the electrolyte injection hole, the sealing member deformed into a shape corresponding to the electrolyte injection hole comes into tight contact with the chamfered structure due to shear stress between the chamfered structure and the sealing member and forms a sealed state due to frictional interaction between the non-chamfered structure and the sealing member. Consequently, it is possible to reduce a defect rate of secondary batteries and to improve sealability of the electrolyte injection hole without welding.

21 Claims, 3 Drawing Sheets

(56) References Cited

FOREIGN PATENT DOCUMENTS

| | | |
|---|---|---|
| JP | 2002-358948 A | 12/2002 |
| JP | 2003-197179 A | 7/2003 |
| KR | 10-2004-0023253 A | 3/2004 |
| KR | 10-2005-0036635 A | 4/2005 |
| KR | 10-0579366 B1 | 5/2006 |
| KR | 10-0624907 B1 | 9/2006 |
| KR | 10-2007-0063066 A | 6/2007 |
| KR | 10-0922442 B1 | 10/2009 |
| KR | 10-1049818 B1 | 7/2011 |
| WO | WO 2007/069820 A1 | 6/2007 |

\* cited by examiner

【FIG. 1】
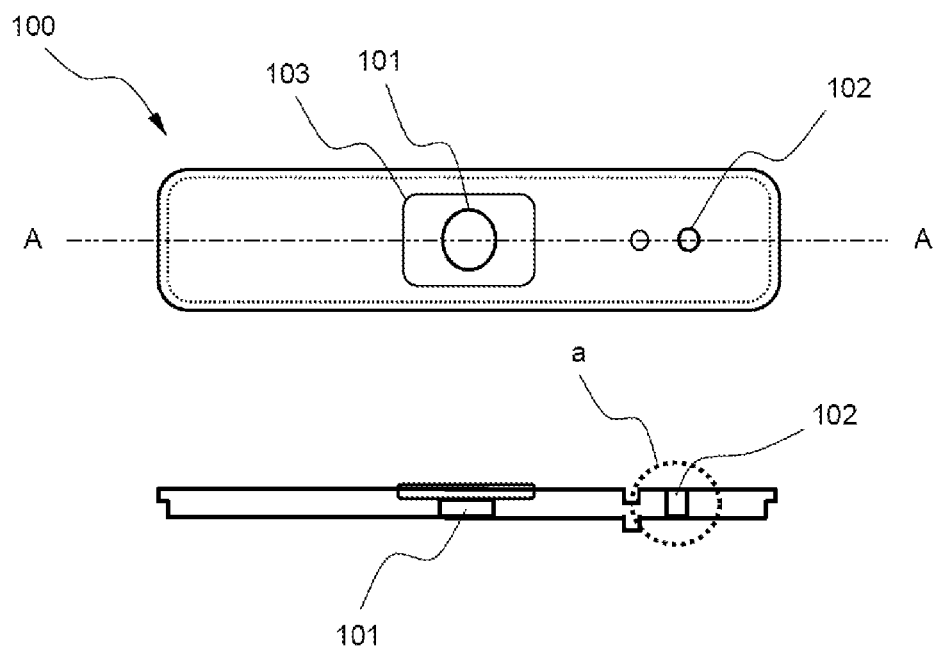
【FIG. 2】
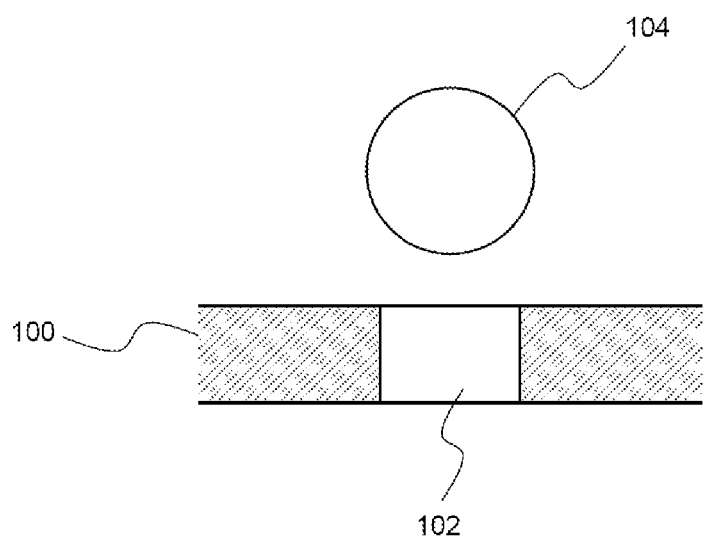

【FIG. 3】
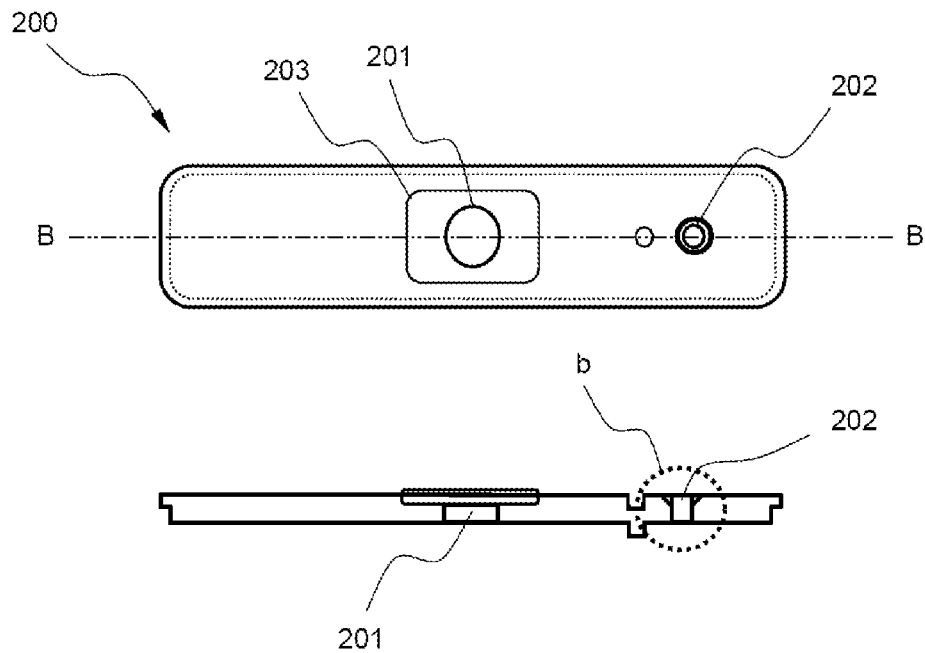
【FIG. 4】
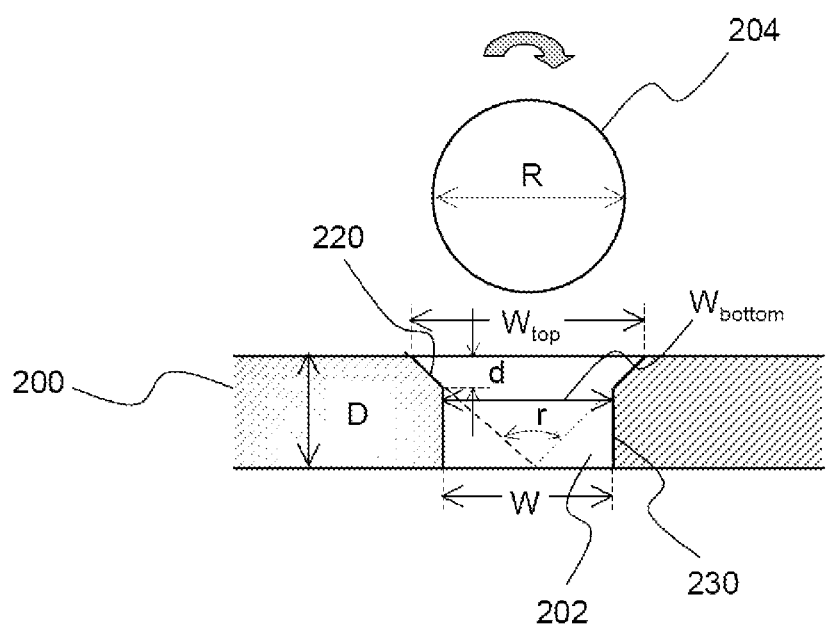

【FIG. 5】
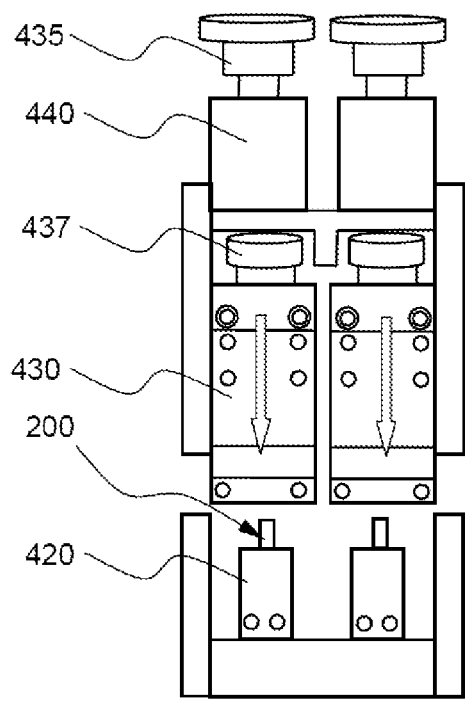
【FIG. 6】
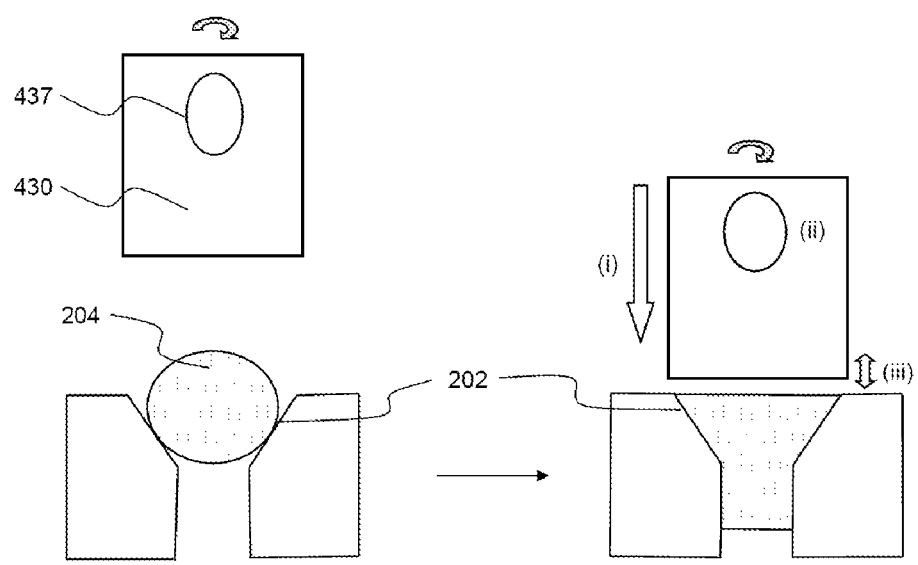

PRISMATIC BATTERY HAVING ELECTROLYTE INJECTION-HOLE CAPABLE OF PROVIDING EXCELLENT SEALING ABILITY

CROSS REFERENCE TO RELATED APPLICATIONS

This application is a Continuation of PCT International Application No. PCT/KR2011/007431 filed on Oct. 7, 2011, which claims priority under 35 U.S.C. § 119(a) to Patent Application No. 10-2010-0098032 filed in the Republic of Korea on Oct. 8, 2010, all of which are hereby expressly incorporated by reference into the present application.

TECHNICAL FIELD

The present invention relates to a prismatic battery having a highly sealable electrolyte injection hole, and, more particularly, to a secondary battery having an electrode assembly mounted in a prismatic container, wherein the inside of an electrolyte injection hole formed in a base plate mounted to an open upper end of the prismatic container includes an upper part having a chamfered structure in which the diameter of the electrolyte injection hole is gradually decreased downward and a lower part having a non-chamfered structure continuously formed from the chamfered structure, and, when a sealing member is pressed into the electrolyte injection hole, the sealing member deformed into a shape corresponding to the electrolyte injection hole comes into tight contact with the chamfered structure due to shear stress between the chamfered structure and the sealing member and forms a sealed state due to frictional interaction between the non-chamfered structure and the sealing member.

BACKGROUND ART

As mobile devices have been increasingly developed, and the demand for such mobile devices has increased, the demand for secondary batteries as an energy source for the mobile devices has also sharply increased. Based on external and internal structures thereof, the secondary batteries are generally classified into a cylindrical battery, a prismatic battery, and a pouch-shaped battery. As the mobile devices have been miniaturized, the prismatic battery and the pouch-shaped battery, which have a small width to length ratio, have attracted considerable attention recently.

The prismatic secondary battery is manufactured by placing an electrode assembly including cathodes, anodes, and separators in a prismatic battery case, fixing a base plate to the upper end of the battery case, for example, by welding, injecting electrolyte into the battery case through an electrolyte injection hole formed in the base plate, sealing the electrolyte injection hole with a metal ball, mounting a safety element and a protection circuit on the base plate, and sealing the battery case with a housing (an external case).

A plan view of a base plate mounted to the upper end of a battery case of a conventional prismatic secondary battery with a vertical sectional view taken along line A-A is shown in FIG. 1.

Referring to FIG. 1, a base plate 100 is provided at the middle thereof with an electrode terminal 101, which is connected to an electrode tab (for example, an anode tab) of an electrode assembly, such that the electrode terminal 101 protrudes from the base plate 100. The base plate 100 is provided at one side thereof with an electrolyte injection hole 102, through which an electrolyte is injected. Between the protruding electrode terminal 101 and the base plate 100 is disposed an insulating member 103 to electrically isolate the electrode terminal 101 from the base plate 200, which is connected to the other electrode tab (for example, a cathode tab) of the electrode assembly so as to serve as an electrode terminal.

The electrolyte injection hole 102, through which the electrolyte is injected, is formed generally in a quadrangular shape in vertical section as shown in FIG. 2. The electrolyte injection hole 102 is sealed with a sealing member 104, made of aluminum, having a diameter slightly greater than that of the electrolyte injection hole 102. Specifically, the sealing member 104 is located on the electrolyte injection hole 102, and then the sealing member 104 is pressed from above such that the sealing member 104 is plastically deformed to seal the electrolyte injection hole 102. Subsequently, the periphery of the plastically deformed sealing member 104 is laser welded, or a thin metal plate is placed over the plastically deformed sealing member 104 and is laser welded, to seal the electrolyte injection hole.

When the sealing member is plastically deformed and is inserted into the electrolyte injection hole, which is formed in a quadrangular shape in vertical section, to seal the electrolyte injection hole with the sealing member, however, opposite sides of the sealing member are pushed outward by the inside upper end of the electrolyte injection hole. As a result, a groove is formed on the sealing member. The groove negatively affects the sealing of the electrolyte injection hole by laser welding. Furthermore, inside cracks are continuously formed along the interface between the sealing member and the inside surface of the electrolyte injection hole due to formation of the groove with the result that sealability of the electrolyte injection hole is lowered.

A method of applying an adhesive material to the surface of the sealing member and pressing the adhesive material has been developed and used as a non-welding type sealing method. In the above method, however, cost related to the sealing member is increased, and the coating process is added instead of the welding process. For this reason, the above method has no additional advantages.

Also, Japanese Patent Application Publication No. 2004-0023253 and Japanese Patent Application Publication No. 2002-358948 disclose a method of forming the inside upper end of the electrolyte injection hole to have a tapered structure and inserting a sealing member having a shape corresponding to the electrolyte injection hole, instead of a metal ball, into the electrolyte injection hole to seal the electrolyte injection hole. This sealing structure has an effect of preventing generation of the above-mentioned groove. However, this sealing structure has problems in that coupling force between the electrolyte injection hole and the sealing member is low, and therefore, sealability of the electrolyte injection hole is low. For this reason, additional processes must be further carried out to increase such low coupling force, which is troublesome.

Consequently, there is a high necessity for a technology that is capable of fundamentally solving the above-mentioned problems.

DISCLOSURE

Technical Problem

Therefore, the present invention has been made to solve the above problems and other technical problems that have yet to be resolved.

Specifically, it is an object of the present invention to provide a secondary battery having an electrolyte injection hole of a specific structure and shape and a sealing member of a specific structure and shape, thereby reducing a defect rate of secondary batteries and improving sealability of the electrolyte injection hole without welding.

Technical Solution

In accordance with one aspect of the present invention, the above and other objects can be accomplished by the provision of a secondary battery having an electrode assembly mounted in a prismatic container, wherein the inside of an electrolyte injection hole formed in a base plate mounted to an open upper end of the prismatic container includes an upper part having a chamfered structure in which the diameter of the electrolyte injection hole is gradually decreased downward and a lower part having a non-chamfered structure continuously formed from the chamfered structure, and, when a sealing member is pressed into the electrolyte injection hole, the sealing member deformed into a shape corresponding to the electrolyte injection hole comes into tight contact with the chamfered structure due to shear stress between the chamfered structure and the sealing member and forms a sealed state due to frictional interaction between the non-chamfered structure and the sealing member.

That is, the upper part of the inside of the electrolyte injection hole is configured to have the chamfered structure in which the diameter of the electrolyte injection hole is gradually decreased downward. When the sealing member is pressed into the electrolyte injection hole, therefore, the sealing member is easily plastically deformed. Consequently, it is possible to prevent a groove from being formed at the upper end of the pressed sealing member and to prevent cracks from being formed at the interface between the sealing member and the inside surface of the electrolyte injection hole.

Also, when the sealing member is pressed into the electrolyte injection hole, the sealing member is pushed into the non-chamfered structure along the chamfered structure. At this time, the sealing member is deformed with the result that local elastic force is generated. The local elastic force is generated at both the chamber structure and the sealing member, thereby securing sealing force. Also, tight contact force between the non-chamfered structure and the sealing member is increased by elastic force between the non-chamfered structure and the sealing member, thereby securing sealability of the sealing member.

Meanwhile, in a case in which the upper part of the inside of the electrolyte injection hole is configured to have the chamfered structure and the lower part of the inside of the electrolyte injection hole is configured to have the non-chamfered structure, it is possible to prevent the plastically deformed sealing member from being introduced into the lower part of the inside of the electrolyte injection hole and to exhibit higher sealing force, which is very preferable.

If the depth of the chamfered structure is too small, the volume of the plastically deformed sealing member is relatively increased with respect to a space of the chamfered structure with the result that a considerable portion of the sealing member may protrude from the top or the bottom of the base plate, which is not preferable. On the other hand, if the depth of the chamfered structure is too large, it may be difficult to seal the electrolyte injection hole, which is not preferable.

Consequently, the chamfered structure may extend downward from the upper end of the electrolyte injection hole within a range of 0.3×D to 0.7×D on the basis of a depth D of the electrolyte injection hole.

Also, it is preferable for the upper end width of the chamfered structure to be greater than the size of the sealing member such that the sealing member is easily pressed into the electrolyte injection hole to effectively seal the electrolyte injection hole without welding. Specifically, an upper end width ($W_{top}$) of the chamfered structure may satisfy a condition of $1.0 \times R < W_{top} < 1.7 \times R$ on the basis of a diameter R of the sealing member, and a lower end width ($W_{bottom}$) of the chamfered structure may satisfy a condition of $0.5 \times R \leq W_{bottom} \leq 0.9 \times R$ on the basis of the diameter R of the sealing member.

A width W of the non-chamfered structure may be equal to the lower end width $W_{bottom}$ of the chamfered structure to prevent the plastically deformed sealing member from being introduced into the lower part of the inside of the electrolyte injection hole.

According to circumstances, the difference between the upper end width $W_{top}$ and the lower end width $W_{bottom}$ of the chamfered structure may satisfy a condition of 8% to 42% the upper end width $W_{top}$.

For example, if the difference between the upper end width $W_{top}$ and the lower end width $W_{bottom}$ of the chamfered structure exceeds 0.5 mm, the electrolyte injection hole may be frequently deformed with the result that airtightness of the lower part of the electrolyte injection hole may be lowered. For this reason, the difference between the upper end width $W_{top}$ and the lower end width $W_{bottom}$ of the chamfered structure is preferably 0.1 to 0.5 mm.

Meanwhile, the difference between the diameter R of the sealing member and the lower end width $W_{bottom}$ of the chamfered structure may satisfy a condition of 8% to 25% the diameter R of the sealing member.

For example, if the difference between the diameter R of the sealing member and the lower end width $W_{bottom}$ of the chamfered structure exceeds 0.3 mm, the electrolyte injection hole may be frequently deformed with the result that airtightness of the lower part of the electrolyte injection hole may be lowered. For this reason, the difference between the diameter R of the sealing member and the lower end width $W_{bottom}$ of the chamfered structure is preferably 0.1 to 0.3 mm.

An inclination angle of the chamfered structure, which is an angle between chamfer extension lines, may be 30 to 70 degrees, preferably 30 to 64 degrees.

Particularly if the inclination angle of the chamfered structure exceeds 70 degrees, the electrolyte injection hole may be frequently deformed with the result that airtightness of the lower part of the electrolyte injection hole may be lowered, which is not preferable.

As in the previous description, if the inclination angle of the chamfered structure is too small, the relatively large sealing member may protrude from the top or the bottom of the base plate, which is not preferable. On the other hand, if the inclination angle of the chamfered structure is too large, sealability of the electrolyte injection hole may be lowered or cracks may be formed at the sealing member, which is not preferable.

Consequently, the depth, the width, and the inclination angle of the chamfered structure may be appropriately decided depending upon the sizes of the electrolyte injection hole and the base plate. The sealing member may be partially deformed as needed as long as the sealing member is plastically deformed to easily seal the electrolyte injection hole.

In a preferred example, the sealing member may be formed in a spherical shape, and the electrolyte injection hole may be formed in a circular shape in horizontal section.

That is, the sealing member, when pressed, is plastically deformed to seal the electrolyte injection hole. Preferably, the sealing member is a metal ball.

Meanwhile, the sealing member may be pressed in a state in which the sealing member is located on the electrolyte injection hole, and the frictional interaction between the sealing member and the electrolyte injection hole may be further increased by the downward chamfered structure to increase the contact area between the sealing member and the electrolyte injection hole.

Also, a polymer resin, such as an epoxy resin, may be applied to the periphery of the electrolyte injection hole to hermetically seal the periphery of the electrolyte injection hole in a state in which the electrolyte injection hole is sealed after the sealing member is pressed.

Methods of pressing the sealing member are not limited so long as the electrolyte injection hole is sealed by the sealing member.

In a preferred example, the sealing member may be pressed while being rotated in a clockwise direction or in a counterclockwise direction to seal the electrolyte injection hole. A press is moved downward while being rotated. As compared with a conventional direct downward movement, therefore, impacts applied to the sealing member and the electrolyte injection hole are lowered, which is very effective in improving physically sealed type airtightness.

Preferably, the press, performing the downward movement while being rotated, presses the sealing member into the electrolyte injection hole by one-time pressing. Although the electrolyte injection hole is sealed by one-time pressing, impact applied to the electrolyte injection hole is lower than in a conventional method. Consequently, it is possible to prevent the electrolyte injection hole from being collapsed and deformed. In addition, it is possible to improve airtightness of the lower part of the electrolyte injection hole and to improve process efficiency.

In another preferred example, after the press, performing the downward movement while being rotated, presses the sealing member into the electrolyte injection hole by one-time pressing, the press may repeatedly press the sealing member at a predetermined height to seal the electrolyte injection hole.

In this case, it is possible to easily seal the electrolyte injection hole merely through insertion and pressing of the sealing member without welding, thereby greatly simplifying the process and achieving improved sealability.

Specifically, the predetermined height may be 1 to 5 cm from the electrolyte injection hole, and the sealing member may be repeatedly pressed 5 to 20 times. Also, pressure applied from the press to the sealing member is lowered from conventional 5 kgf to 3 kgf. Consequently, it is possible to secure airtightness and uniformity between the plastically deformed sealing member and the electrolyte injection hole.

DESCRIPTION OF DRAWINGS

The above and other objects, features and other advantages of the present invention will be more clearly understood from the following detailed description taken in conjunction with the accompanying drawings, in which:

FIG. 1 is a plan view showing a base plate mounted to the upper end of a battery case of a conventional prismatic secondary battery with a vertical sectional view taken along line A-A;

FIG. 2 is an enlarged view showing a dotted-line circle a of FIG. 1;

FIG. 3 is a plan view showing a base plate, having an electrolyte injection hole formed therein, of a prismatic secondary battery according to an embodiment of the present invention with a vertical sectional view taken along line B-B;

FIG. 4 is an enlarged view showing a dotted-line circle b of FIG. 3;

FIG. 5 is a typical view showing an apparatus for manufacturing a secondary battery according to an embodiment of the present invention; and FIG. 6 is a typical view showing a process of pressing an electrolyte injection hole and a sealing member according to another embodiment of the present invention.

BEST MODE

Now, preferred embodiments of the present invention will be described in detail with reference to the accompanying drawings. It should be noted, however, that the scope of the present invention is not limited by the illustrated embodiments.

FIG. 3 is a plan view showing a base plate, having an electrolyte injection hole formed therein, of a prismatic secondary battery according to an embodiment of the present invention with a vertical sectional view taken along line B-B, and FIG. 4 is an enlarged view typically showing a dotted-line circle b of FIG. 3.

Referring to these drawings, a base plate 200 is provided at the middle thereof with an electrode terminal 201, which is connected to an anode tab of an electrode assembly (not shown), such that the electrode terminal 201 protrudes from the base plate 200. The base plate 200 is provided at one side thereof with an electrolyte injection hole 202. At the upper end of the base plate 200 adjacent to the electrolyte injection hole 202 is formed a groove, by which a protection circuit module is stably mounted to the base plate 200. Between the electrode terminal 201 and the base plate 200 is disposed an insulating member 203, which electrically isolates the electrode terminal 201 from the base plate 200, which is connected to a cathode tab of the electrode assembly.

The upper part of the inside of the electrolyte injection hole 202 of the base plate 200 is configured to have a chamfered structure 220 in which the diameter of the electrolyte injection hole 202 is gradually decreased downward. The lower part of the inside of the electrolyte injection hole 202 of the base plate 200 is configured to have a non-chamfered structure 230. The non-chamfered structure 230 is a vertical through structure substantially having no inclination.

The chamfered structure 220 extends downward from the upper end of the electrolyte injection hole such that a depth d of the chamfered structure 220 is about 0.4 to 0.6 times a depth D of the electrolyte injection hole. An inclination angle r of the chamfered structure 220, which is an angle between chamfer extension lines, is about 45 degrees.

Also, an upper end width $W_{top}$ of the chamfered structure 220 is about 1.2 times a diameter R of a sealing member 204, and a lower end width $W_{bottom}$ of the chamfered structure 220 is about 0.7 times the diameter R of the sealing member 204. A width W of the non-chamfered structure 230 is equal to the lower end width $W_{bottom}$ of the chamfered structure 220.

A spherical sealing member 204, having a diameter greater than the upper end width $W_{top}$, is pressed into the electrolyte injection hole 202 by a rotary press to seal the electrolyte injection hole 202. The sealing member 204 may be a metal ball.

FIG. 5 is a typical view showing an apparatus for manufacturing a secondary battery according to an embodiment of the present invention, and FIG. 6 is a typical view showing the operation of a press to press an electrolyte injection hole and a sealing member according to another embodiment of the present invention.

Referring to these drawings together with FIG. 4, a secondary battery manufacturing apparatus 400 includes a die to fix a prismatic container (not shown) having an electrode assembly (not shown) mounted therein and a base plate 200 mounted to an open upper end thereof, a press 430 to perform vertical reciprocation (iii) above the die 420 and press the sealing member 204 during a downward movement (i) such that the sealing member 204 is pressed into the electrolyte injection hole 202 of the base plate 200, and a controller 440 to control the operation of the press 430.

The press 430 includes a cylinder 435 to perform the vertical reciprocation (iii) and a rotary motor 437 to rotate the press 430. When the press 430 performs the downward movement (i), therefore, the press 430 presses the sealing member 204 while performing rotation (ii) in a clockwise direction on the basis of the sealing member 204.

Also, the controller 440 controls the press 430 to press the sealing member 204 through about ten vertical reciprocations (iii) in a state in which the press 430 is moved upward by a height L of about 3 cm after the press 430 presses the sealing member 204 through one downward movement (i).

In this case, the press 430 presses the sealing member 204 at relatively low pressure, e.g. a pressure G of about 3 kgf, to secure airtightness and uniformity between the plastically deformed sealing member and the electrolyte injection hole.

That is, the press 430 performs the vertical reciprocations (iii) with respect to the sealing member 204 while being rotated (ii) in the clockwise direction by the rotary motor 437, thereby preventing the electrolyte injection hole from being collapsed and deformed. In addition, sealability of the electrolyte injection hole is improved, thereby securing airtightness of the battery.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, a secondary battery according to the present invention includes a base plate having an electrolyte injection hole of a specific structure. Consequently, it is possible to reduce the number of manufacturing processes of the battery and to lower a defect rate of secondary batteries. Also, it is possible to greatly reduce leakage of an electrolyte out of the battery.

The invention claimed is:

1. A method of making a secondary battery having an electrode assembly mounted in a prismatic container, comprising:

mounting a base plate to an open upper end of the prismatic container;

forming an inside of an electrolyte injection hole to comprise an upper part having a chamfered structure in which a diameter of the electrolyte injection hole gradually decreases downward and a lower part having a non-chamfered structure continuously formed from the chamfered structure; and simultaneously pressing and rotating a sealing member into the electrolyte injection hole to seal the electrolyte injection hole, said rotating being in a clockwise direction or in a counterclockwise direction; and repeatedly, simultaneously rotating and pressing the sealing member at a predetermined height to seal the electrolyte injection hole after the sealing member is pressed into the electrolyte injection hole by one-time pressing, wherein, during pressing, the sealing member is deformed into a shape corresponding to the electrolyte injection hole by the sealing member coming into tight contact with the chamfered structure due to shear stress between the chamfered structure and the sealing member and a sealed state is formed due to frictional interaction between the non-chamfered structure and the sealing member without welding.

2. The method according to claim 1, wherein an upper end width (Wtop) of the chamfered structure satisfies a condition of $1.0 \times R < Wtop < 1.7 \times R$ on the basis of a diameter (R) of the sealing member.

3. The method according to claim 1, wherein a lower end width (Wbottom) of the chamfered structure satisfies a condition of $0.5 \times R \leq Wbottom \leq 0.9 \times R$ on the basis of a diameter (R) of the sealing member.

4. The method according to claim 1, wherein a width (W) of the non-chamfered structure is equal to a lower end width (Wbottom) of the chamfered structure.

5. The method according to claim 1, wherein the pressing and rotating of the sealing member is performed by a press that reciprocates along an axis towards and away from the sealing member and rotates about said axis in the corresponding clockwise or counterclockwise direction.

6. The method according to claim 1, wherein no welding is performed on the sealing member after the repeatedly, simultaneously rotating and pressing the sealing member at the predetermined height to seal the electrolyte injection hole.

7. A method of making a secondary battery having an electrode assembly mounted in a prismatic container, comprising:

mounting a base plate to an open upper end of the prismatic container;

forming an electrolyte injection hole in the base plate, wherein an inside of the electrolyte injection hole comprises an upper part having a chamfered structure in which a diameter of the electrolyte injection hole is gradually decreased downward and an inclined angle of the upper part is constant, and a lower part having a non-chamfered structure continuously formed from the chamfered structure;

simultaneously pressing and rotating a sealing member into the electrolyte injection hole to seal the electrolyte injection hole, said rotating being in a clockwise direction or in a counterclockwise direction; and repeatedly, simultaneously rotating and pressing the sealing member at a predetermined height to seal the electrolyte injection hole after the sealing member is pressed into the electrolyte injection hole by one-time pressing, wherein, during pressing, the sealing member is deformed into a shape corresponding to the electrolyte injection hole by the sealing member coming into tight contact with the chamfered structure due to shear stress between the chamfered structure and the sealing member and a sealed state is formed due to frictional interaction between the non-chamfered structure and the sealing member without welding, and wherein the chamfered structure extends downward from an upper end of the electrolyte injection hole within a range of 0.3×D to 0.7×D on the basis of a depth (D) of the electrolyte injection hole.

8. The method according to claim 7, wherein an upper end width ($W_{top}$) of the chamfered structure satisfies a condition of $1.0 \times R < W_{top} < 1.7 \times R$ on the basis of a diameter (R) of the sealing member.

9. The method according to claim 7, wherein a lower end width ($W_{bottom}$) of the chamfered structure satisfies a condition of $0.5 \times R \leq W_{bottom} 0.9 \times R$ on the basis of a diameter (R) of the sealing member.

10. The method according to claim 7, wherein a width (W) of the non-chamfered structure is equal to a lower end width ($W_{bottom}$) of the chamfered structure.

11. The method according to claim 7, wherein a difference between an upper end width ($W_{top}$) and a lower end width ($W_{bottom}$) of the chamfered structure satisfies a condition of 8% to 42% the upper end width ($W_{top}$).

12. The method according to claim 7, wherein a difference between a diameter (R) of the sealing member and a lower end width ($W_{bottom}$) of the chamfered structure satisfies a condition of 8% to 25% the diameter (R) of the sealing member.

13. The method according to claim 7, further comprising forming an inclination angle of the chamfered structure between chamfer extension lines at an angle of 30 to 70 degrees.

14. The method according to claim 7, further comprising forming the sealing member in a spherical shape, and forming the electrolyte injection hole in a circular shape in horizontal section.

15. The method according to claim 7, wherein the sealing member is a metal ball.

16. The method according to claim 7, further comprising pressing the sealing member in a state in which the sealing member is located on the electrolyte injection hole; and increasing the frictional interaction between the sealing member and the electrolyte injection hole by the downward chamfered structure to increase contact area between the sealing member and the electrolyte injection hole.

17. The method according to claim 7, wherein the predetermined height is 1 to 5 cm from the electrolyte injection hole.

18. The method according to claim 7, further comprising pressing the sealing member 5 to 20 times.

19. The method according to claim 1, wherein an inclined angle of the upper part of the electrolyte injection hole is constant.

20. The method according to claim 7, wherein the pressing and rotating of the sealing member is performed by a press that reciprocates along an axis towards and away from the sealing member and rotates about said axis in the corresponding clockwise or counterclockwise direction.

21. The method according to claim 7, wherein no welding is performed on the sealing member after the repeatedly, simultaneously rotating and pressing the sealing member at the predetermined height to seal the electrolyte injection hole.

* * * * *